US008799467B2

(12) United States Patent
Shah et al.

(10) Patent No.: US 8,799,467 B2
(45) Date of Patent: Aug. 5, 2014

(54) STORAGE AND COMMUNICATION DE-DUPLICATION

(75) Inventors: Nilesh R. Shah, Bothell, WA (US);
Tyler M. Barton, Seattle, WA (US);
Gianluigi Nusca, Seattle, WA (US);
Ravi T. Rao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 96 days.

(21) Appl. No.: 13/229,621

(22) Filed: Sep. 9, 2011

(65) Prior Publication Data
US 2013/0067080 A1 Mar. 14, 2013

(51) Int. Cl.
G06F 15/16 (2006.01)

(52) U.S. Cl.
USPC .......................................... 709/225; 709/224

(58) Field of Classification Search
USPC ............... 709/200–203, 217–227, 228, 229
See application file for complete search history.

(56) References Cited

U.S. PATENT DOCUMENTS

| 7,266,645 | B2 * | 9/2007 | Garg et al. ..................... 711/133 |
| 7,747,584 | B1 | 6/2010 | Jernigan, IV |
| 8,005,891 | B2 * | 8/2011 | Knowles et al. ............ 709/203 |
| 8,195,763 | B2 * | 6/2012 | Knowles et al. ............ 709/217 |
| 8,200,969 | B2 * | 6/2012 | Vachuska ....................... 713/168 |
| 8,230,008 | B2 * | 7/2012 | Tsirkin et al. ................. 709/203 |
| 2004/0162885 | A1 * | 8/2004 | Garg et al. ..................... 709/213 |
| 2007/0179985 | A1 * | 8/2007 | Knowles et al. ............ 707/200 |
| 2009/0063883 | A1 | 3/2009 | Mori |
| 2009/0113145 | A1 | 4/2009 | Slater et al. |
| 2009/0182789 | A1 | 7/2009 | Sandorfi et al. |
| 2009/0196296 | A1 * | 8/2009 | Vachuska ................. 370/395.32 |
| 2009/0228599 | A1 | 9/2009 | Anglin et al. |
| 2010/0042790 | A1 | 2/2010 | Mondal et al. |
| 2010/0094817 | A1 | 4/2010 | Ben-Shaul et al. |
| 2011/0022718 | A1 | 1/2011 | Evans et al. |
| 2011/0167221 | A1 | 7/2011 | Pangal et al. |
| 2012/0290537 | A1 * | 11/2012 | Smith et al. ................... 707/654 |
| 2012/0290546 | A1 * | 11/2012 | Smith et al. ................... 707/700 |

OTHER PUBLICATIONS

International Search Report and Written Opinion dated Sep. 26, 2012, issued in Application Serial No. PCT/US2011/055660.
Mayer, et al., "A Study of Practical Deduplication", Retrieved at <<http://www.cs.ubc.ca/~dmeyer/msfs_fast11-final.pdf>>, Proceedings of the 9th USENIX conference on File and stroage technologies, 2011, pp. 13.
Yang, et al., "3DNBS: A Data De-duplication Disk-based Network Backup System", Retrieved at <<http://ieeexplore.ieee.org/stamp/stamp.jsp?tp=&arnumber=5197342>>, IEEE International Conference on Networking, Architecture, and Storage, Jul. 9-11, 2009, pp. 287-294.
Wei, et al., "MAD2: A Scalable High-Throughput Exact Deduplication Approach for Network Backup Services", Retrieved at <<http://ieeexplore.ieee.org/stamp/stamp.jsp?tp=&arnumber=5496987>>, Proceedings of the 26th IEEE Symposium on Mass Storage Systems and Technologies, May 3-7, 2010, pp. 14.

* cited by examiner

Primary Examiner — Moustafa M Meky
(74) Attorney, Agent, or Firm — John Jardine; Andrew Sanders; Micky Minhas

(57) ABSTRACT

Storage and communication de-duplication are described. In one or more implementations, a system comprises one or more modules that are implemented at least partially in hardware, the one or more modules configured to utilize one or more algorithms to calculate hashes of chunks of data, the hashes used to replace the chunks in the data for storage locally in the system as well as to communicate the hashes in response to a request received via a network for the data to avoid communicating at least one of the chunks of the data via the network.

20 Claims, 7 Drawing Sheets

STORAGE AND COMMUNICATION DE-DUPLICATION

BACKGROUND

The amount of data that even casual users generate and interact with is ever increasing. For example, a user may interact with a social network service, store photos, communicate the photos with other users, read and respond to emails and instant messages, view videos, and so on. Consequently, the resources used to support this interaction (e.g., data storage and communication) may become burdened by this amount of data. Traditional techniques that were utilized to alleviate at least some of this strain, however, were often disjointed and therefore could also consume significant amounts of resources and limit the sophistication of the techniques that could be employed.

SUMMARY

Storage and communication de-duplication are described. In one or more implementations, a system comprises one or more modules that are implemented at least partially in hardware, the one or more modules configured to utilize one or more algorithms to calculate hashes of chunks of data, the hashes used to replace the chunks in the data for storage locally in the system as well as to communicate the hashes in response to a request received via a network for the data to avoid communicating at least one of the chunks of the data via the network.

In one or more implementations, a sending device replaces one or more chunks of data with the one or more identifiers, stores the one or more chunks and the one or more identifiers, and stores the data as having the one or more identifiers. Responsive to a request to communicate the data via a network, a communication is formed to communicate via the network, the communication having the one or more identifiers of the one or more chunks from the data. The one or more identifiers are configured for use by a receiving device to identify whether the one or more chunks are available locally at the receiving device.

In one or more implementations, a receiving device receives a communication via a network, the communication having one or more identifiers of one or more chunks taken from data. The one or more identifiers from the communication are compared to one or more identifiers of chunks that are available locally to the receiving device. Responsive to a determination that at least one of the identifiers from the communication matches at least one of the identifiers of a corresponding chunk that is available locally to the receiving device, the at least one identifier is replaced with the corresponding chunk. Responsive to a determination that at least one of the identifiers from the communication does not match at least one of the identifiers of a corresponding chunk that is available locally to the receiving device, a communication is formed to be communicated via the network to a sender of the communication to cause the sender to communicate the corresponding chunk via the network for receipt by the receiving device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Previous techniques used to increase efficiency in the utilization of file storage and file communication often involved dedicated devices. Further, these techniques were often fractured and thus limited the sophistication of algorithms that could be employed in traditional scenarios.

Storage and communication de-duplication techniques are described. In one or more implementations, storage and communication de-duplication are unified to reduce redundancy and increase efficiency of data storage and communication. These techniques may be used to chunk data and calculate hashes of the chunks for storage. The chunks may then be stored once and the hashes used to identify the chunks in the original data. Therefore, this data could be reconstructed using the hashes and the chunks when access is desired.

Additionally, these chunks and hashes may also be used to support communication. For example, these techniques may be used to support a caching system in which chunks and identifying hashes are made available locally to a requestor. Therefore, when a user forms a request for an item of data, the hashes may be communicated first. The hashes may then be used to determine whether the chunks are available locally. If so, those chunks are not requested from the data provider. If not, those chunks that are not available may be requested. In this way, the hashes and chunks may be used to support both techniques thereby improving efficiency of both storage and communication of data. Further, this combination may be used to support functionality that otherwise was not available to one or more of the techniques traditionally, such as the use of computationally expensive algorithms to form the chunks and hashes for use in communication. Continued discussion of these and other implementations may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
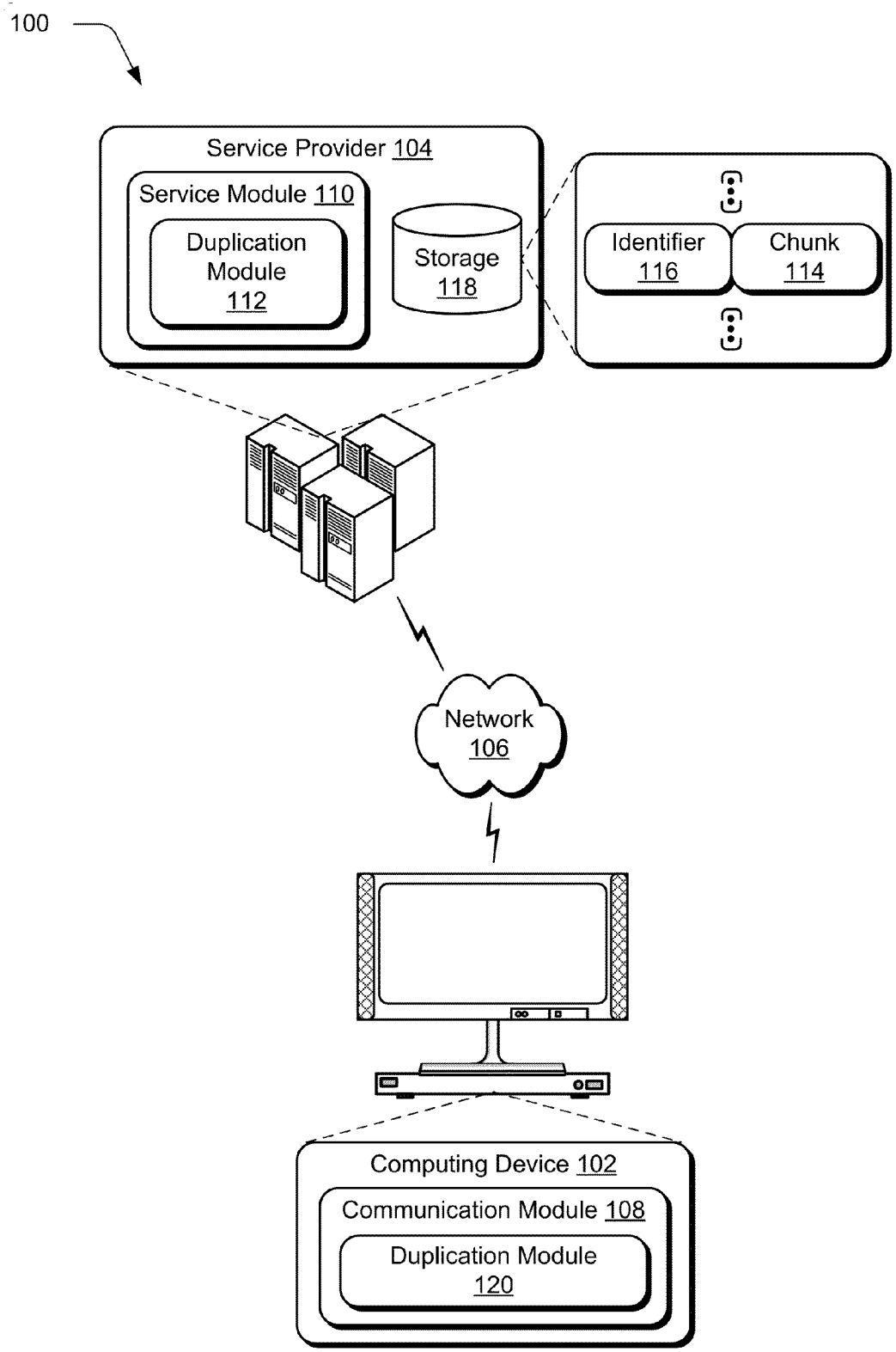
FIG. 1 is an illustration of an environment in an example implementation that is operable to perform storage and communication de-duplication techniques.

FIG. 1 is an illustration of an environment 100 in an example implementation that is operable to employ techniques described herein. The illustrated environment 100 includes a computing device 102 that is communicatively coupled to a service provider 104 via a network 106. The computing device 102 as well as computing devices that may implement the service provider 104 may be configured in a variety of ways.

For example, a computing device may be configured as a computer that is capable of communicating over the network 106, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of one or more of a plurality of different devices, such as multiple servers utilized by a business to perform operations such as by the service provider 104, a desktop computer as part of a local network (e.g., a branch that employs a branch cache), and so on.

Although the network 106 is illustrated as the Internet, the network may assume a wide variety of configurations. For example, the network 106 may include a wide area network (WAN), a local area network, a public telephone network, an intranet, a peer-to-peer network and so on. Further, although a single network 106 is shown, the network 106 may be configured to include multiple networks.

The computing device 102 is further illustrated as including a communication module 108. The communication module 108 is representative of functionality of the computing device 102 to communicate via the network 106. For example, the communication module 108 may be configured as part of a browser, a network-enabled application, an operating system, and so on. This functionality may thus be used to interact via the network 106 to send and/or receive data of interest, such as from the service provider 104.

The service provider 104 is illustrated as including a service module 110. The service module 110 is representative of functionality of the service provider 104 to manage one or more network services. A variety of network services may be managed, such as a social network service, image storage service, email service, calendaring service, file synchronization service, video streaming service, and so on. As such, these services may involve a vast amount of data to be stored and communicated.

Accordingly, the service module 110 is also illustrated as including a duplication module 112. The duplication module 112 is representative of functionality to employ de-duplication techniques that may be used in storage and communication of data. For example, the duplication module 112 may the used to calculate chunks 114 from data, as well as identifiers 116 of the chunks 114. The identifiers 116 may be used as pointers to replace the chunks in an item of data to be stored in storage 118 at the service provider 104. The duplication module 112 may then use the identifiers 116 as an index to locate corresponding chunks 114. Thus, the duplication module 112 may be used to increase efficiency in the use of the storage 118 by reducing an amount of duplication of data in the storage 118.

The computing device 102 may also leverage all or a part of this functionality, as illustrated through inclusion of a duplication module 120 at the computing device 102. For example, the duplication module 120 may also be used to reduce an amount of duplication of data at the computing device 102. The duplication modules 112, 120 of the service provider 104, and computing device 102, respectively, may also be used to support de-duplication in communication via the network 106, such as through communication of the identifiers 116 to locate chunks 114 that were already communicated via the network 106, such as at the computing device 102 itself or available locally via a local connection, such as a peer in a peer-to-peer network, available from a dedicated cache server, and so on. Thus, these techniques may be used to increase efficiency of both storage and communication, further discussion of which may be found in relation to FIG. 2.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
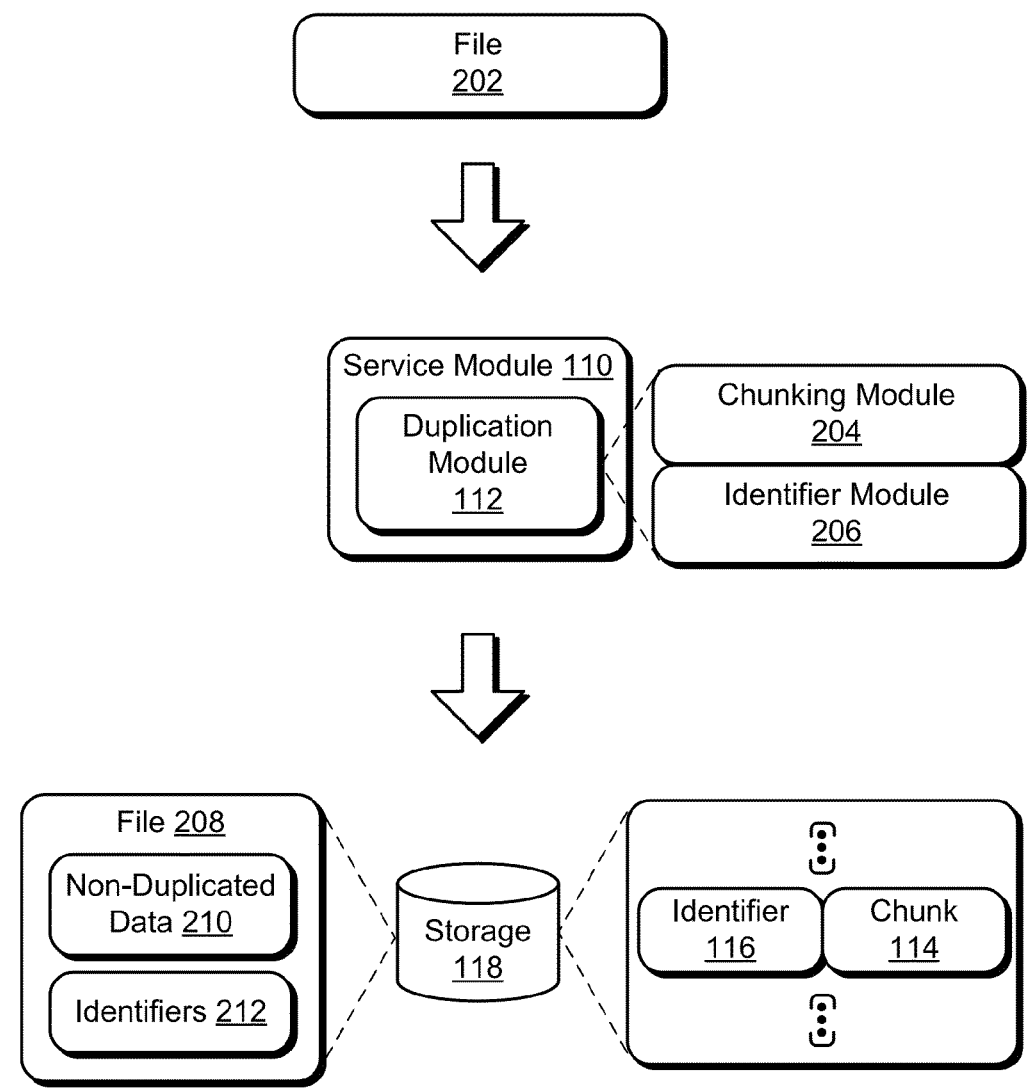
FIG. 2 is an illustration of a system in an example implementation showing generation of chunks and identifiers for use in storage of a file.

FIG. 2 is an illustration of a system 200 in an example implementation showing generation of chunks and identifiers for use in storage of a file. Although the following examples describe operation of the duplication module 112 by the service module 110, it should be readily apparent that these techniques may also be employed by the duplication module 120 at the computing device 102.

A file 202 to be stored is received at the service module 110. The service module 110 may thus employ the duplication module 112 to determine whether the file 202 is suitable for use of the de-duplication techniques. For example, the duplication module 112 may employ a chunking module 204 that is representative of functionality to form chunks 114 from the file 202. A variety of different algorithms may be employed by the chunking module 204 to identify and form these chunks, such as a Rabin chunking algorithm, an algorithm to find minimums and maximums in the data of the file 202, and so on. For example, the chunking module 204 may employ algorithms to detect similarity of data and thus identify the chunks. This may be used to increase the chances of detecting similarity between different items of content.

The duplication module 112 may also employ an identifier module 206. The identifier module 206 is representative of functionality to form an identifier 116 for each chunk 114. The identifier module 206, for instance, may form the identifiers 116 as hashes from data that forms the chunk 114. A variety of other identifiers 116 are also contemplated.

The duplication module 112 may be configured to employ the chunking and identifier modules 204, 206 in a variety of ways, such as to pre-compute the chunks 114 and identifiers, may be performed offline during periods of time when a server load is relatively low, and so on. Thus, the duplication module 112 may take advantage of times when increased processing resources are available at a relatively low "cost" to perform the computations of the chunking and identifier modules 204, 206.

The chunks 114 and corresponding identifiers 116 may then be stored in storage 118. The identifiers 116 may also be used as pointers in the file 202 to increase storage efficiency. For example, file 202 may be stored as file 208 that includes non-duplicated data 210, such as data that was not used to form one or more chunks 114 by the chunking module 204. The file 208 may also include identifiers 212 for chunks that are included in the storage 118. Thus, the file 202 may be readily reconstructed from file 208 by replacing the identifiers 212 with corresponding chunks 114. These identifiers may also be used to improve efficiency in communication, an example of which is described in relation to the following figure.

Figure 3:
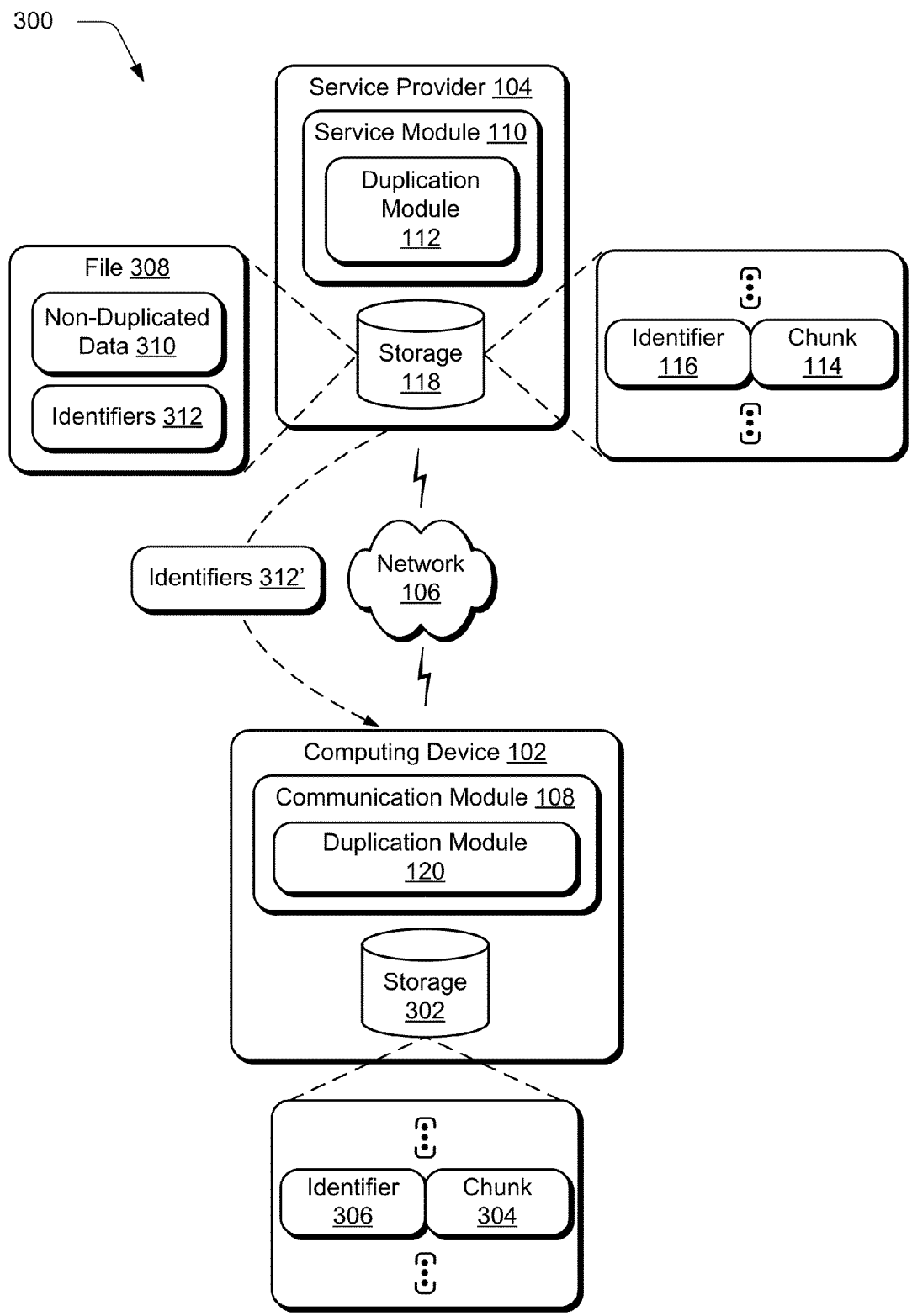
FIG. 3 is an illustration of a system in an example implementation showing use of chunks and identifiers generated in FIG. 2 for use in communicating another file.

FIG. 3 depicts a system 300 in an example implementation showing use of chunks and identifiers generated in FIG. 2 for use in communicating another file. In this example, the computing device 102 is illustrated as including a communication module 108 and a duplication module 120 as described in relation to FIG. 1. The computing device 102 is also illustrated as including storage 302 having chunks 304 and corresponding identifiers 306, e.g., having chunks 304 and identifiers 306 formed from the file 202 as described in relation to FIG. 2. The storage 302 may be local to the computing device 102 itself, available from a shared cache of data, e.g., as part of a remote branch office via a local network connection, a peer-to-peer network, a dedicated server cache, and so on. The duplication module 120 may leverage this storage 302 to improve efficiency of communication via the network 106.

For example, the communication module 108 may form a request to be communicated to the service provider 104 for a file 308. This may be performed as part of a request for the file 308 via an Internet, over a wireless connection such as a wireless access network, and so on.

The file 308 includes a portion of non-duplicated data 310 and identifiers 312 of chunks included in storage 118. Thus, like before this may be used to increase efficiency in the storage of the file 308 at the service provider 104. It should be readily apparent that other examples are also contemplated in which an entirety of a payload of the file 308 is represented using identifiers. However, in this example the file 308 does not match the file 202 described in relation to FIG. 2, e.g., has at least some portion that does not match, although again this technique is equally applicable to communication of the file 202 of FIG. 2.

Regardless, in response to the request the service module 110 may communicate the identifiers 312' to the computing device 102. The duplication module 120 may then compare the identifiers 312' to identifiers 306 included in the storage 302 to see if the corresponding chunks are available locally at the computing device. If so, the duplication module 120 may reconstitute those portions of the file 308 using those chunks without involving additional communication via the network.

For identifiers 312' that do not match identifiers 306 in storage 302, the duplication module 120 may request chunks 114 that correspond to those identifiers to be communicated via the network 106. These chunks 114 may then be used to reconstruct the file 308 as well as for inclusion in storage 302 to improve efficiency of communication of related data for subsequent requests for the data as well for storage at the computing device 102, itself. Thus, these techniques may be used to overcome the shortcomings of traditional techniques that were often fractured and resource intensive. Further discussion of storage and communication de-duplication may be found in relation to the following procedures.

Example Procedures

The following discussion describes storage and communication de-duplication techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200, 300 of FIGS. 2 and 3, respectively.

Figure 4:
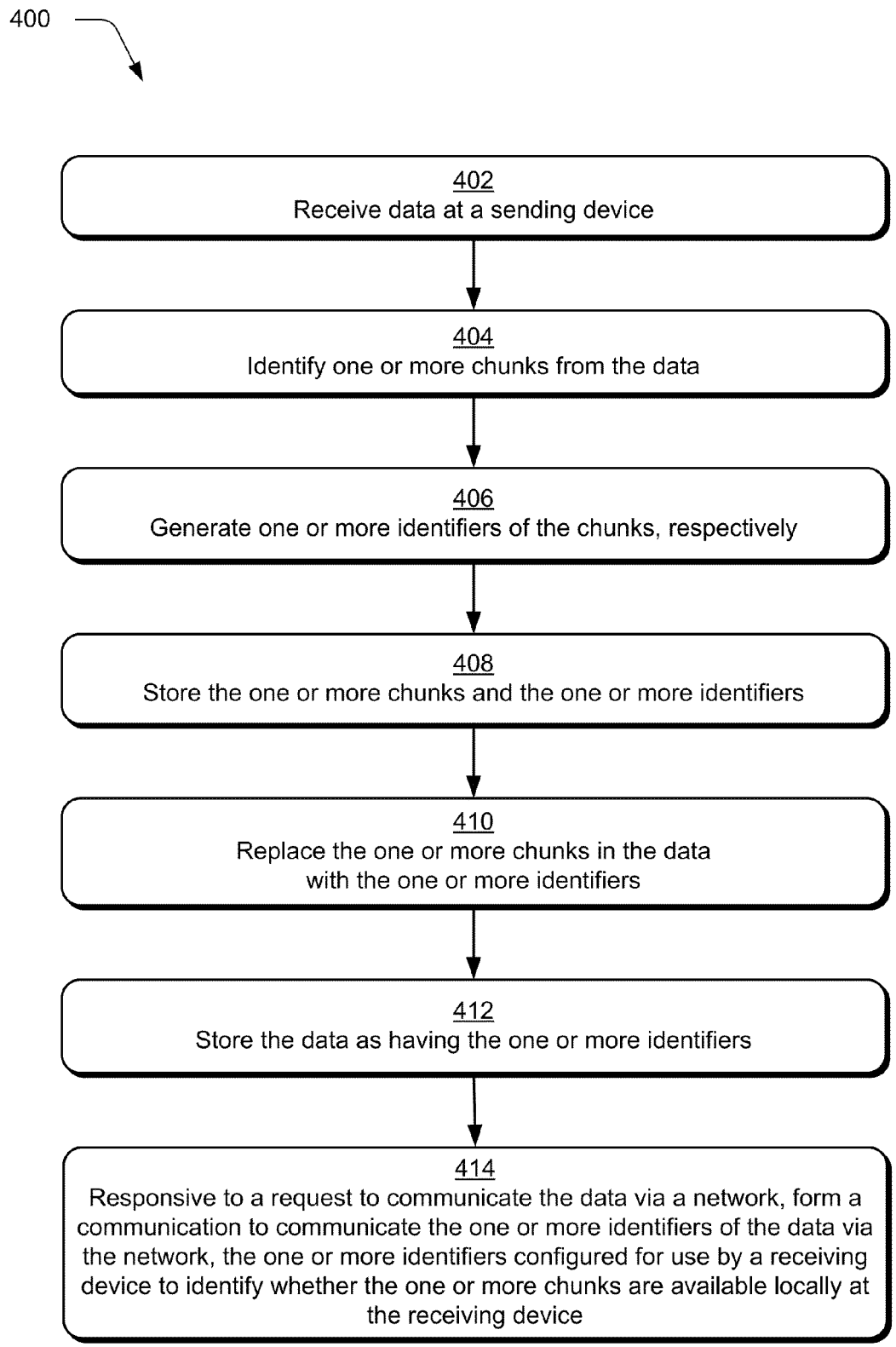
FIG. 4 is a flow diagram depicting a procedure in an example implementation in which data is chunked and identifiers are formed at a sending device.

FIG. 4 depicts a procedure 400 in an example implementation in which data is chunked and identifiers are formed at a sending device. Data is received at a sending device (block 402). For example, the data may be generated by the service provider 104 itself, posted to a service provider, or received by a variety of other entities.

One or more chunks are identified from the data (block 404). A duplication module 112, for instance, may employ a chunking module 204 to form chunks from the received data, e.g., a file 202. The chunks may be formed in a variety of ways, assume a variety of sizes, and so on.

One or more identifiers are generated of the chunks, respectively (block 406). The identifiers, for instance, may be formed as a hash of the data included in the chunks 114. Other identifiers are also contemplated which may be based on a variety of other data, such as metadata associated with a content item.

The one or more chunks and the one or more identifiers are stored (block 408). The duplication module 112, for instance, may be configured to maintain storage 118 as a cache that includes identifiers 116 that may be used to locate the corresponding chunks 114. In this way, the chunks 114 and corresponding identifiers 116 may be used in associated with a plurality of different items of data to increase efficiency in storage 118 usage.

The one or more chunks in the data are replaced with the one or more identifiers (block 410). The data is then stored as having the one or more identifiers (block 412). As shown in FIG. 2, for instance, a file 208 may be generated that corresponds to file 202. File 208, however, may include identifiers 212 that may act as pointers to storage 118 such that duplication of the chunks 114 in the storage 118 is reduced. The chunks 114 and identifier 116 may also be leveraged to improve efficiency of network communication, such as communication over a wireless area network.

For example, responsive to a request to communicate the data via a network, a communication is formed to communicate the one or more identifiers of the data via the network, the one or more identifiers configured for use by a receiving device to identify whether the one or more chunks are available locally at the receiving device (block 414). In this way, the receiving device (e.g., computing device 102) may determine whether chunks 114 of the file 208 are available locally without involving actual communication of the chunks. Thus, these techniques may be used to support both storage and communication and thus avoid inefficient usage of resources as was encountered using conventional techniques. Further discussion of communication of data may be found in relation to the following procedure.

Figure 5:
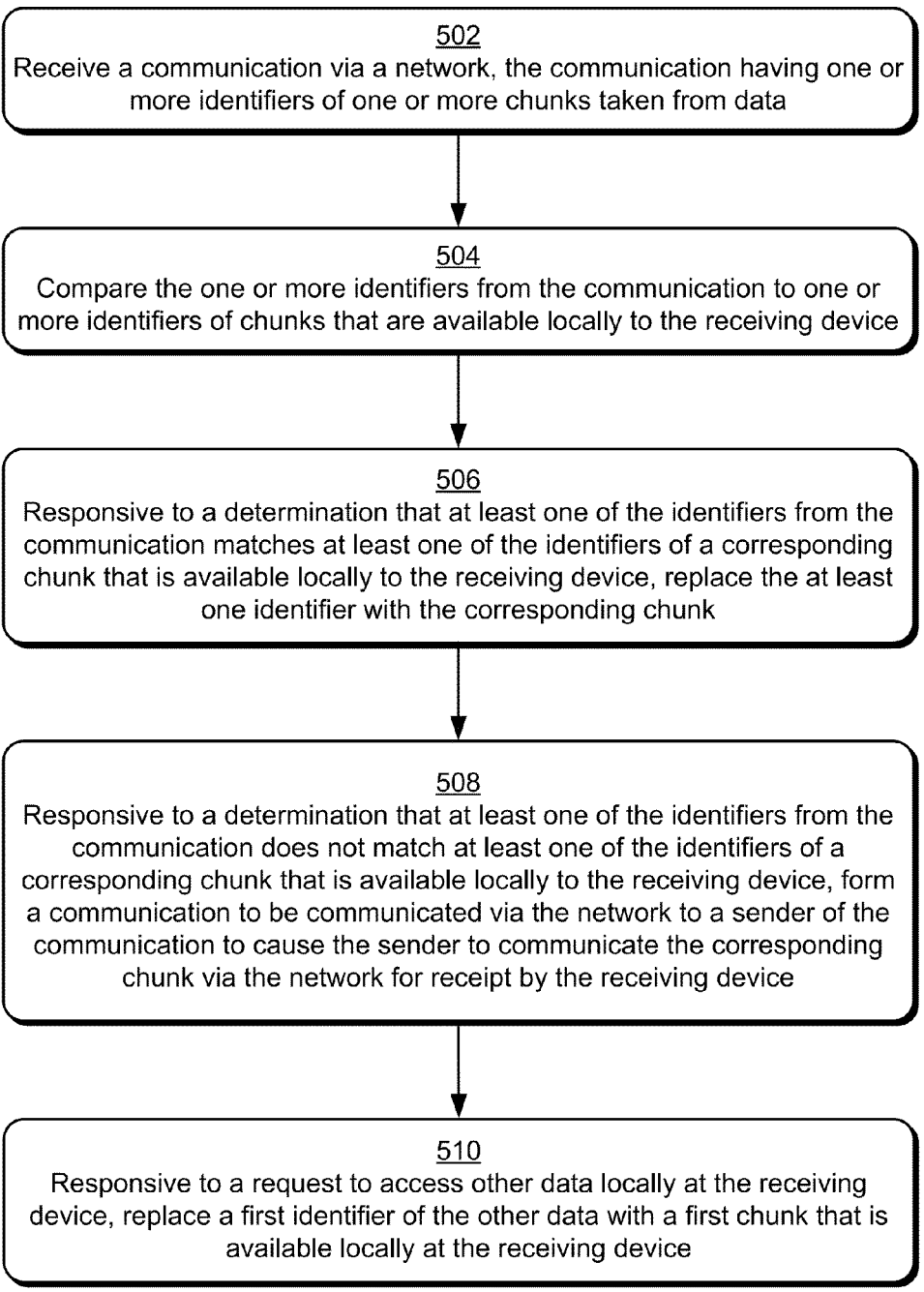
FIG. 5 is a flow diagram depicting a procedure in an example implementation in which identifiers are received at a receiving device in response to a request for data.

FIG. 5 depicts a procedure 500 in an example implementation in which identifiers are received at a receiving device in response to a request for data. A communication is received via a network, the communication having one or more identifiers of one or more chunks taken from data (block 502). As before, the computing device 102 may form a request to a service provider 104 for an item of data. In another example, the communication may be received unprompted, such as an email.

The one or more identifiers from the communication are compared to one or more identifiers of chunks that are available locally to the receiving device (block 504). The computing device 102, for instance, may incorporate similar techniques for storage and communication of data at the computing device 102 through use of duplication module 120. This may include use of matching algorithms to form chunks 304 and identifiers 306 of those chunks as those employed by duplication module 112.

Responsive to a determination that at least one of the identifiers from the communication matches at least one of the identifiers of a corresponding chunk that is available locally to the receiving device, the at least one identifier is replaced with the corresponding chunk (block 506). In this way, the computing device 102 may help reconstruct an item of data using data that is obtained locally by the computing device 102 and not remotely from the service provider 104, e.g., from a branch cache at a remote branch office.

Responsive to a determination that at least one of the identifiers from the communication does not match at least one of the identifiers of a corresponding chunk that is available locally to the receiving device, a communication is formed to be communicated via the network to a sender of the communication to cause the sender to communicate the corresponding chunk via the network for receipt by the receiving device (block 508). Thus, the duplication module 120 may get whatever chunks are missing in the storage 302 that is local to the computing device 102 from the service provider 104 and thus reduce use of network resources 106 as well as improve efficiency in access to the data.

Example System and Device

Figure 6:
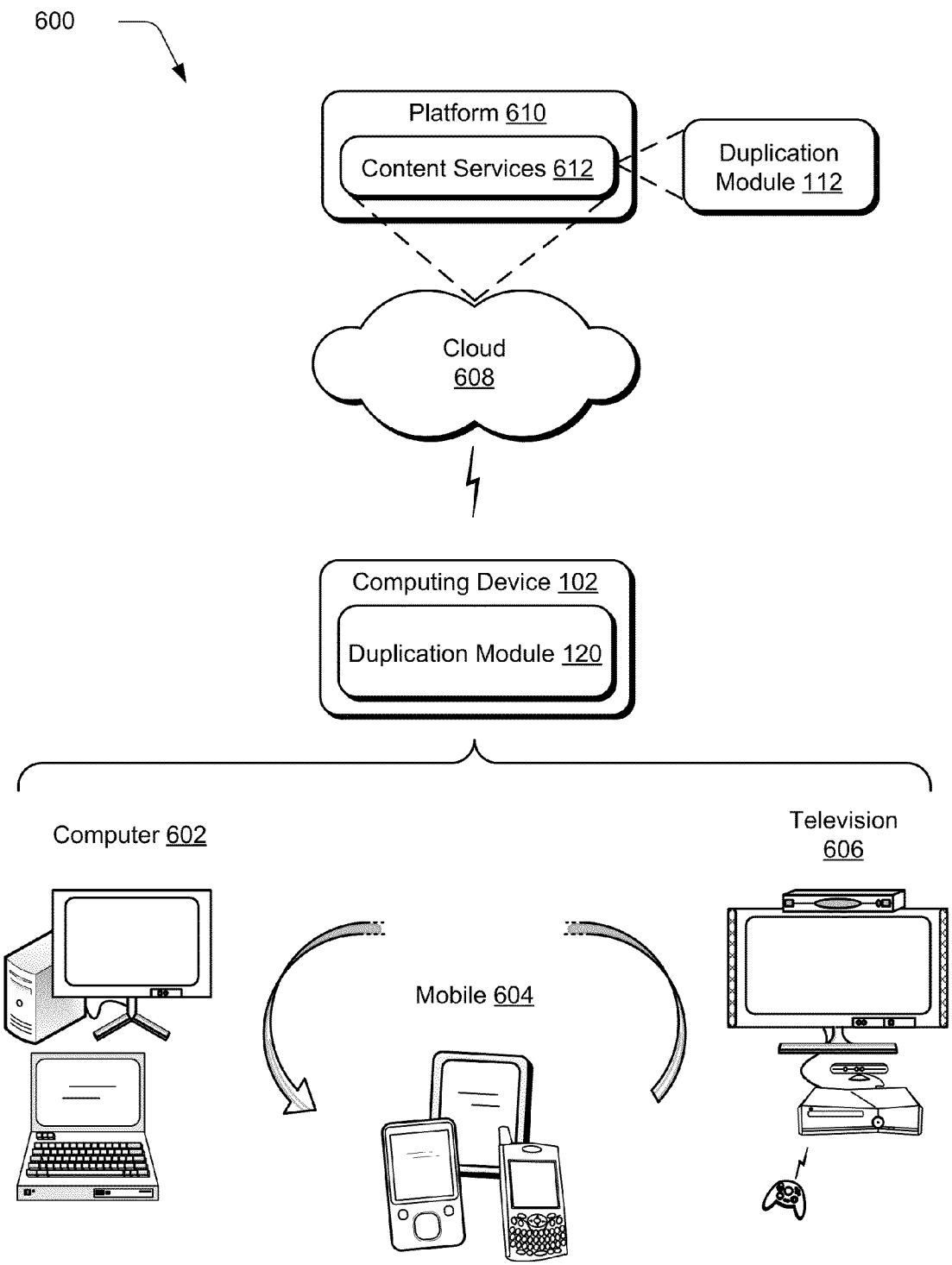
FIG. 6 illustrates an example system that includes the computing device as described with reference to FIG. 1.

FIG. 6 illustrates an example system 600 that includes the computing device 102 as described with reference to FIG. 1. The example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 602, mobile 604, and television 606 uses. Each of these configurations includes devices that may have generally different constructs and capabilities, and thus the computing device 102 may be configured according to one or more of the different device classes. For instance, the computing device 102 may be implemented as the computer 602 class of a device that includes a personal computer, desktop computer, a multi-screen computer, laptop computer, netbook, and so on.

The computing device 102 may also be implemented as the mobile 604 class of device that includes mobile devices, such as a mobile phone, portable music player, portable gaming device, a tablet computer, a multi-screen computer, and so on. The computing device 102 may also be implemented as the television 606 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein, which are illustrated through inclusion of the duplication module 120.

These techniques may also be incorporated whole or in part "over the cloud" as illustrated by duplication module 112. The cloud 608 includes and/or is representative of a platform 610 for content services 612. The platform 610 abstracts underlying functionality of hardware (e.g., servers) and software resources of the cloud 608. The content services 612 may include applications and/or data that can be utilized while computer processing is executed on servers that are remote from the computing device 102. Content services 612 can be provided as a service over the Internet and/or through a subscriber network, such as a cellular or Wi-Fi network.

The platform 610 may abstract resources and functions to connect the computing device 102 with other computing devices. The platform 610 may also serve to abstract scaling of resources to provide a corresponding level of scale to encountered demand for the content services 612 that are implemented via the platform 610. Accordingly, in an interconnected device embodiment, implementation of functionality of the functionality described herein may be distributed throughout the system 600. For example, the functionality may be implemented in part on the computing device 102 as well as via the platform 610 that abstracts the functionality of the cloud 608.

Figure 7:
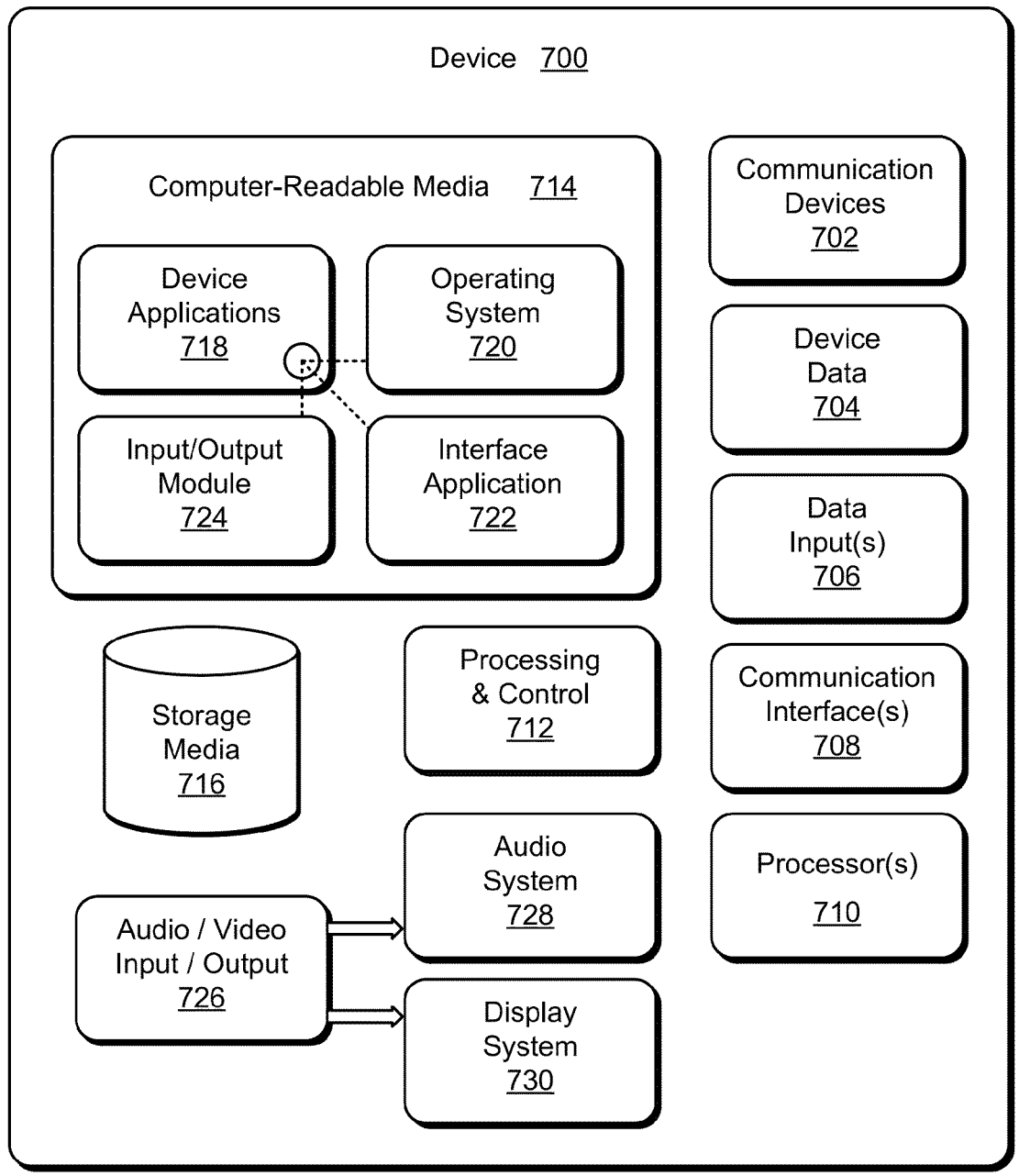
FIG. 7 illustrates various components of an example device that can be implemented as any type of computing device as described with reference to FIGS. 1-3 and 6 to implement embodiments of the techniques described herein.

FIG. 7 illustrates various components of an example device 700 that can be implemented as any type of computing device as described with reference to FIGS. 1, 2, and 6 to implement embodiments of the techniques described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable instructions to control the operation of device 700 and to implement embodiments of the techniques described herein. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.). The device applications 718 also include any system components or modules to implement embodiments of the techniques described herein. In this example, the device applications 718 include an interface application 722 and an input/output module 724 that are shown as software modules and/or computer applications. The input/output module 724 is representative of software that is used to provide an interface with a device configured to capture inputs, such as a touchscreen, track pad, camera, microphone, and so on. Alternatively or in addition, the interface application 722 and the input/output module 724 can be implemented as hardware, software, firmware, or any combination thereof. Additionally, the input/output module 724 may be configured to support multiple input devices, such as separate devices to capture visual and audio inputs, respectively.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, image data. Video signals and audio signals can be communicated from and device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a sending device, the method comprising:

prior to receiving a request to communicate a content item via a network, identifying one or more duplicate chunks of data from the content item by comparing data in the content item to previously stored data, wherein the one or more duplicate chunks of data from the content item are one or more chunks of data from the content item that match data that has been previously stored;

generating one or more identifiers for the one or more duplicate chunks of data, wherein each of the one or more identifiers are associated with respective ones of the one or more duplicate chunks of data;

storing the one or more identifiers;

storing the content item such that each of the stored one or more identifiers replace the respective identified ones of the one or more duplicate chunks of data, whereby each duplicate chunk of data is stored only once at the sending device; and responsive to the request to communicate the data via a network, forming a communication to communicate via the network, the communication having the stored content item with the one or more identifiers associated with the one or more duplicate chunks of data, the one or more identifiers configured to be usable to identify whether the one or more duplicate chunks are available to a receiving device at least one of the group consisting of: a local cache and a peer-to-peer network.

2. A method as described in claim 1, further comprising:
replacing the one or more identifiers with the respective ones of the one or more duplicate chunks of data when the data is not available locally to the receiving device; and
sending the one or more duplicate chunks of data to the receiving device.

3. A method as described in claim 1, wherein the one or more identifiers are hashes of the respective ones of the one or more duplicate chunks of data.

4. A method as described in claim 1, wherein at least one of the one or more identifiers included in the communication is usable by the receiving device to identify that a respective one of the one or more duplicate chunks of data is available locally to the receiving device.

5. A method as described in claim 4, wherein the identification is performed such that the respective one of the one or more duplicate chunks of data is not communicated from the sending device to the receiving device via the network.

6. A method as described in claim 1, wherein the network is a wide area network.

7. A method as described in claim 1, wherein at least one of the one or more duplicate chunks of data and the respective associated identifier are usable reconstruct another item of data.

8. A method as described in claim 1, wherein at least one of the one or more duplicate chunks of data is usable to replace communication of the at least one of the one or more chunks of data for another item of data.

9. A method as described in claim 1, further comprising identifying the one or more duplicate chunks of data using an algorithm, wherein the algorithm detects similarities between different items of content stored at the sending device.

10. A method as described in claim 1, further comprising identifying the one or more duplicate chunks of data using a Rabin chunking algorithm.

11. A method implemented by a receiving device, the method comprising:
receiving a communication via a network, the communication having a content item, stored at sender, with one or more identifiers associated with one or more chunks taken from data;
comparing the one or more identifiers from the communication to one or more identifiers of chunks that are available to the receiving device at a local cache;
responsive to a determination that at least one of the identifiers from the communication matches at least one of the identifiers of a corresponding chunk that is available to the receiving device at the local cache, replacing the at least one identifier with the corresponding chunk from the local cache;
responsive to a determination that at least one of the identifiers from the communication does not match at least one of the identifiers of a corresponding chunk that is available to the receiving device at the local cache, comparing the one or more identifiers from the communication to one or more identifiers of chunks that are available to the receiving device via a peer-to-peer network;
responsive to a determination that at least one of the identifiers from the communication matches at least one of the identifiers of a corresponding chunk that is available to the receiving device via a peer-to-peer network, replacing the at least one identifier with the corresponding chunk from the peer-to-peer network; and
responsive to a determination that at least one of the identifiers from the communication does not match at least one of the identifiers of a corresponding chunk that is available to the receiving device at the local cache or the peer-to-peer network, forming a communication to be communicated via the network to a sender of the communication to cause the sender to communicate the corresponding chunk via the network for receipt by the receiving device.

12. A method as described in claim 11, further comprising responsive to a request to access other data locally at the receiving device, replacing a first identifier of the other data with a first chunk that is available locally to the receiving device.

13. A method as described in claim 11, wherein the identifiers are hashes of respective chunks.

14. A method as described in claim 11, wherein the network is a wide area network, and the peer-to-peer network is a local area network.

15. A method as described in claim 11, wherein at least one of the chunks that are available locally to the receiving device is usable to reconstruct another item of data at the receiving device.

16. A method as described in claim 11, wherein at least one of the chunks that are available locally at the receiving device is usable replace communication of the at least one chunk for another item of data.

17. A sending device comprising:
a memory; and
at least one processor coupled to the memory, the at least one processor configured to:
prior to receiving a request to communicate a content item via a network, identify one or more duplicate chunks of data from the content item by comparing data in the content item to previously stored data, wherein the one or more duplicate chunks of data from the content item are one or more chunks of data from the content item that match data that has been previously stored;
generate one or more identifiers for the one or more duplicate chunks of data, wherein each of the one or more identifiers are associated with respective ones of the one or more duplicate chunks of data;
store the one or more identifiers;
store the content item and the one or more identifiers such that each of the one or more identifiers replace the respective ones of the one or more duplicate chunks of data, whereby each duplicate chunk of data is stored only once at the sending device; and
form a communication to communicate via a network, the communication having the stored content item with the one or more identifiers associated with the one or more duplicate chunks of data, the one or more identifiers configured to be usable to identify whether the one or more duplicated chunks are available to a receiving device at at least one of the group consisting of: a local cache and a peer-to-peer network.

18. The sending device of claim 17, wherein the one or more identifiers are hashes of the respective ones of the one or more duplicate chunks of data.

19. The sending device of claim 17, wherein at least one of the one or more identifiers included in the communication is usable by the receiving device to identify that a respective one of the one or more duplicate chunks of data is available locally to the receiving device.

20. The sending device of claim 19, wherein the identification is performed such that the respective one of the one or more duplicate chunks of data is not communicated from the sending device to the receiving device via the network.

* * * * *